(12) United States Patent
Hillman

(10) Patent No.: US 7,054,627 B1
(45) Date of Patent: May 30, 2006

(54) METHOD AND SYSTEM FOR LOCATING A WIRELESS NETWORK ACCESS POINT AT A MOBILE COMPUTING DEVICE

(75) Inventor: Garth D. Hillman, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 514 days.

(21) Appl. No.: 10/134,833

(22) Filed: Apr. 29, 2002

(51) Int. Cl.
*H04Q 7/20* (2006.01)

(52) U.S. Cl. .............. 455/422.1; 455/426.2; 455/448; 455/446; 455/524; 455/457; 370/328; 370/338; 370/337

(58) Field of Classification Search .............. 455/456.1, 455/456.6, 457, 465, 514, 183.2, 185.1; 370/328–338, 370/401
See application file for complete search history.

(56) References Cited

U.S. PATENT DOCUMENTS

| | | | |
|---|---|---|---|
| 5,717,688 A | 2/1998 | Belanger et al. | |
| 5,889,474 A * | 3/1999 | LaDue | 340/825.49 |
| 6,067,297 A | 5/2000 | Beach | |
| 6,188,681 B1 | 2/2001 | Vesuna | |
| 6,243,581 B1 | 6/2001 | Jawanda | |
| 6,366,856 B1 | 4/2002 | Johnson | |
| 6,424,643 B1 * | 7/2002 | Gutowski | 370/342 |
| 6,772,142 B1 * | 8/2004 | Kelling et al. | 707/3 |
| 2002/0006788 A1 * | 1/2002 | Knutsson et al. | 455/422 |
| 2002/0022491 A1 * | 2/2002 | McCann et al. | 455/456 |
| 2002/0055926 A1 * | 5/2002 | Dan et al. | 707/100 |
| 2002/0061755 A1 * | 5/2002 | Nohara et al. | 455/457 |
| 2002/0102989 A1 * | 8/2002 | Calvert et al. | 455/456 |
| 2002/0105934 A1 * | 8/2002 | Lee et al. | 370/338 |
| 2002/0173981 A1 * | 11/2002 | Stewart | 705/1 |
| 2003/0069033 A1 * | 4/2003 | Edge et al. | 455/502 |
| 2003/0165128 A1 * | 9/2003 | Sisodia et al. | 370/338 |

* cited by examiner

Primary Examiner—Sonny Trinh
Assistant Examiner—Khai Nguyen
(74) Attorney, Agent, or Firm—Zagorin O'Brien Graham LLP

(57) ABSTRACT

A network includes an Internet connection element and a plurality of wireless device access points. Each of the plurality of wireless device access points includes a wireless transceiver and each of the plurality of wireless device access points is coupled to the Internet connection element. A location of at least one of the plurality of wireless device access points is represented on a map that is accessible via the Internet.

12 Claims, 4 Drawing Sheets

METHOD AND SYSTEM FOR LOCATING A WIRELESS NETWORK ACCESS POINT AT A MOBILE COMPUTING DEVICE

BACKGROUND

1. Field of the Invention

The present invention relates generally to mobile computing devices and wireless data networks.

2. Description of the Related Art

With the increased deployment of mobile computing devices, such as notebook computers, personal digital assistants and smart phones, many users desire both mobility and connectivity to various networks and data sources, such as access to the Internet and e-mail. To provide for such mobility and connectivity, many wireless local area network (WLAN) receiving stations have been deployed in public places, such as airports, malls and hotels. While a mobile computer user typically has knowledge of WLAN stations within the work environment, such users while travelling and in public places often do not know the location of suitable WLAN stations for providing a network connection. Accordingly; there is a need for an improved system and method for dynamically locating wireless network access points.

SUMMARY

The present invention relates generally to wireless network access points, methods for locating such access points, and to related networks. In a particular embodiment, the network includes an Internet connection element and a plurality of wireless device access points. Each of the plurality of wireless device access points includes a wireless transceiver and each of the plurality of wireless device access points is coupled to the Internet connection element. A location of at least one of the plurality of wireless device access points is represented on a map that is accessible via the Internet.

In another embodiment, a mobile computing device is disclosed. In a particular embodiment, the mobile computing device includes a computer processor, a computer memory coupled to the computer processor, a first radio element, and a second radio element. The first radio element is to provide for communication with a wireless network access point. The second radio element is to provide for communication with a wireless wide area network element. Data retrieved via the second radio element is stored in the computer memory and the retrieved data includes map data that identifies location information with respect to the wireless network access point and the location of the mobile computing device.

In another embodiment, a method for use in connection with a wireless data network is disclosed. In a particular embodiment, the method includes the steps of determining a location of an access point within the wireless data network, storing the location of the access point in a map database, making the map database including the location of the access point available to a plurality of computer users via a distributed computer network, and communicating the map database to a mobile computing device using a wireless wide area network.

In another particular embodiment, the method includes acquiring a map having wireless network access point location information and determining a location of the mobile computing device.

BRIEF DESCRIPTION OF THE DRAWINGS

The use of the same reference symbols in different drawings indicates similar or identical items.

DETAILED DESCRIPTION OF THE DRAWINGS

Figure 1:
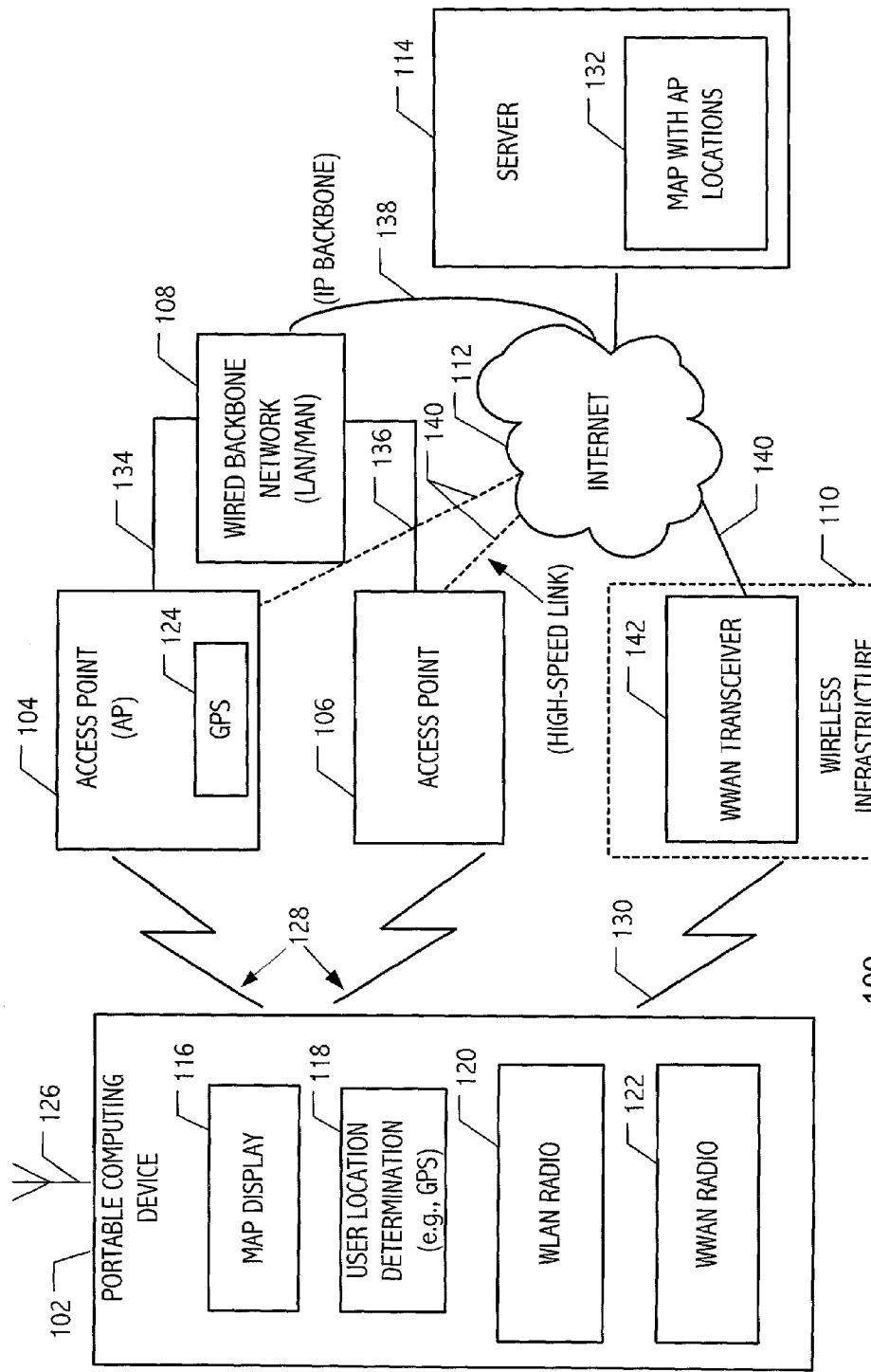
FIG. 1 is a block diagram that illustrates a wireless data network and mobile computing device that accesses the wireless data network via access points and wide area network infrastructure.

Referring to FIG. 1, a system 100 in accordance with an embodiment of the present invention is disclosed. The system 100 includes a portable computer device 102 and various infrastructure equipment. The infrastructure equipment includes various access points such as access points 104 and 106, wireless wide area communications infrastructure 110, the Internet 112, a wired backbone network such as a local area network or a metropolitan area network 108 and a representative computer server 114. The wireless access points 104 and 106 are connected to the wired backbone network 108. The wired backbone network 108 is connected to the Internet 112 via an internet protocol (IP) backbone 138. The computer server 114 is connected to the Internet 112. Access points 104 and 106 may optionally be directly connected to the Internet using a high-speed link 140 such as cable, xDSL, or T1 connection. The wireless infrastructure 110 includes conventional wireless communication equipment such as antennas, base stations, switching equipment, and a wide area network transceiver 142 configured for wireless data communication. The wireless access point 104 may optionally include a global positioning system (GPS) device 124 to determine a location automatically for the wireless access point 104. Other than the addition of the GPS device 124, the access point 104 may be implemented as a conventional access point in accordance with a suitable wireless network standard, such as the wireless local area network standard IEEE 802.11 and related supplements a, b, e, f, h, h and i. The computer server 114 includes storage that has a map including access point locations 132, such as locations of the access points 104 and 106.

The portable computing device 102 includes a wireless wide area network radio 122, a wireless local area network radio 120, a user location determination module such as a GPS receiver 118, and a display 116 for illustrating a map with access points. The portable computing device 102 also includes one or more antennas 126 for wireless communications. The portable computing device 102 may communicate with an access point such as access point 106 using the wireless local area network radio 120 via channel 128, or the portable computing device 102 may communicate with wireless infrastructure 110 using the wireless wide area network radio 122 linked to the wireless wide area network transceiver 142 over channel 130. The portable computing device 102 may communicate simultaneously over channels 128 and 130. While only a single portable computing device 102 is illustrated, it should be understood that the system 100 includes a plurality of portable computing devices and many access points and the wireless wide area network infrastructure equipment is typically configured and distributed to support a large scale data communications network. An example of a suitable wireless wide area network is a commercially available cellular system.

Figure 2:
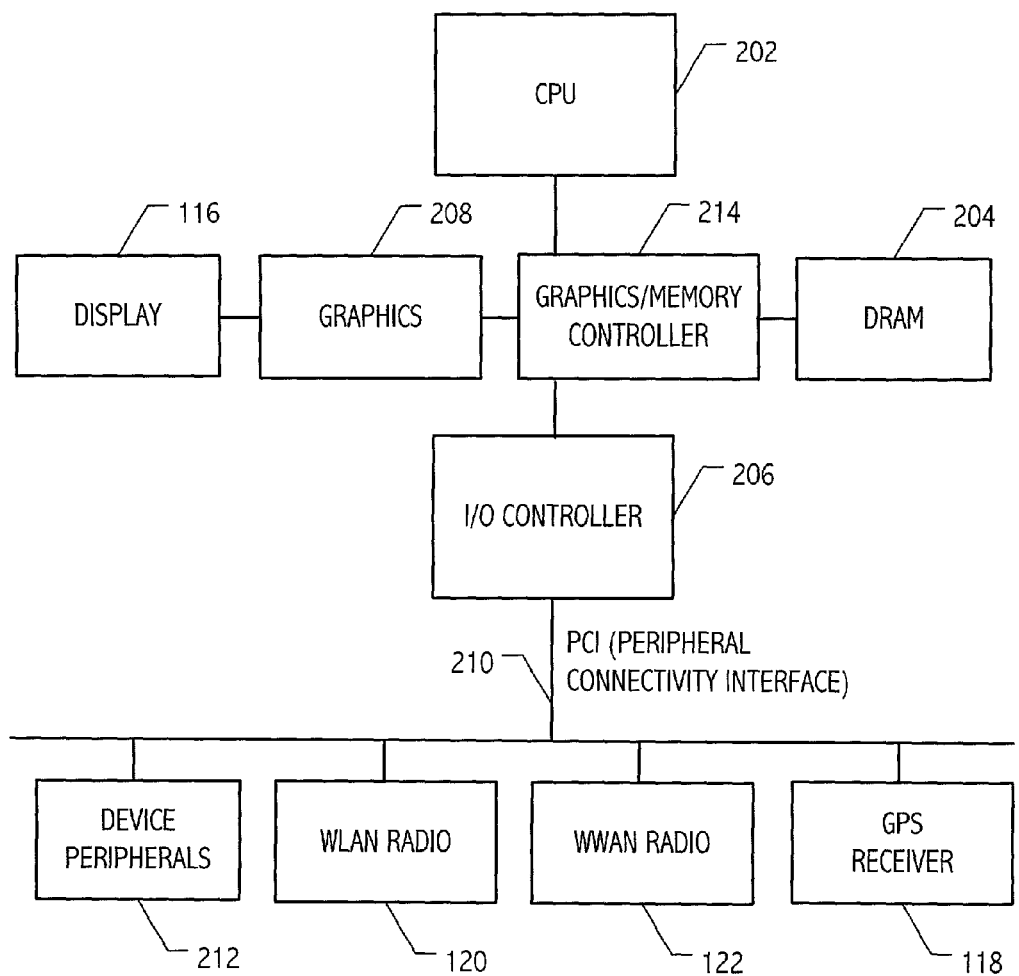
FIG. 2 is a block diagram of a portable computing device with a map display.

Referring to FIG. 2, further details of a particular portable computing device 102 are shown. The portable computing device, in a particular embodiment, includes a central processing unit 202, a graphics/memory controller 214, an input/output controller 206, and a peripheral connectivity interface (PCI) 210 coupled to a variety of peripheral devices. The graphics/memory controller 214 is coupled to a memory, such as dynamic random access memory (DRAM) 204, and is coupled to a graphics module 208. The graphics module 208 is coupled to the display device 116. Illustrative peripherals that may be connected to the PCI bus 210 include the wireless network radio 120, the wireless wide area network radio 122, a GPS receiver 118, and other general computing device peripherals 212, such as input/output device peripherals.

During operation, data messages may be received through the over the air interface by either the wireless network radio 120 or the wireless wide area network radio 122. Such received data messages may pass along PCI bus 210 through the I/O controller 208 and the graphics/memory controller 214 to the memory 204. Once these data messages are stored in memory 204, the CPU 202 may perform processing and other logic operations on the retrieved and stored data messages. Alternatively, the data messages stored within memory 204 may be processed by the graphics module 208 and combined with other user information using an appropriate user interface for display on the display device 116. An example of data for display is a geographic map that includes access point locations received via the wireless wide area network radio 122 and forwarded for display on display device 116 so that a user of the portable computing device 102 can determine the closest or most desirable access point for wireless network connectivity. Once the portable computing device user determines a particular access point, the user may redirect the antenna and/or modify the location of the user for improved communication with the desired selected access point for subsequent data communication using the wireless local area network radio 120.

Figure 3:
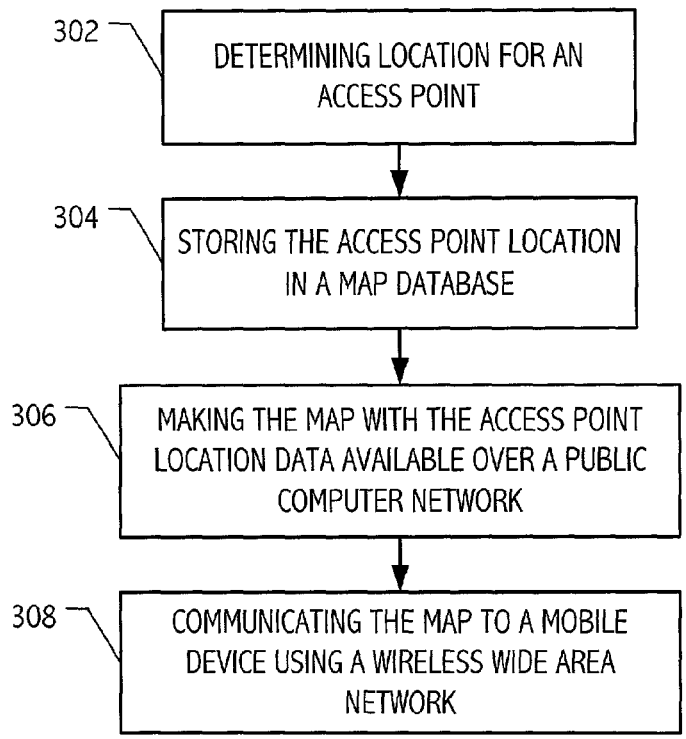
FIG. 3 is a flow chart that illustrates creation and distribution of map information.

Operation of the system 100 will be described with reference to FIGS. 3 and 4. Referring to FIG. 3, a method of operation for the infrastructure portion of the system 100 is shown. In a particular illustrative embodiment, an access point location is determined, at 302, and the access point location is stored in a map database, at 304. The map with the access point location data is made available over a publicly accessible computer network, at 306. An example of a suitable network is the Internet. The map is communicated to a mobile computing device using a wireless wide area network, at 308.

Figure 4:
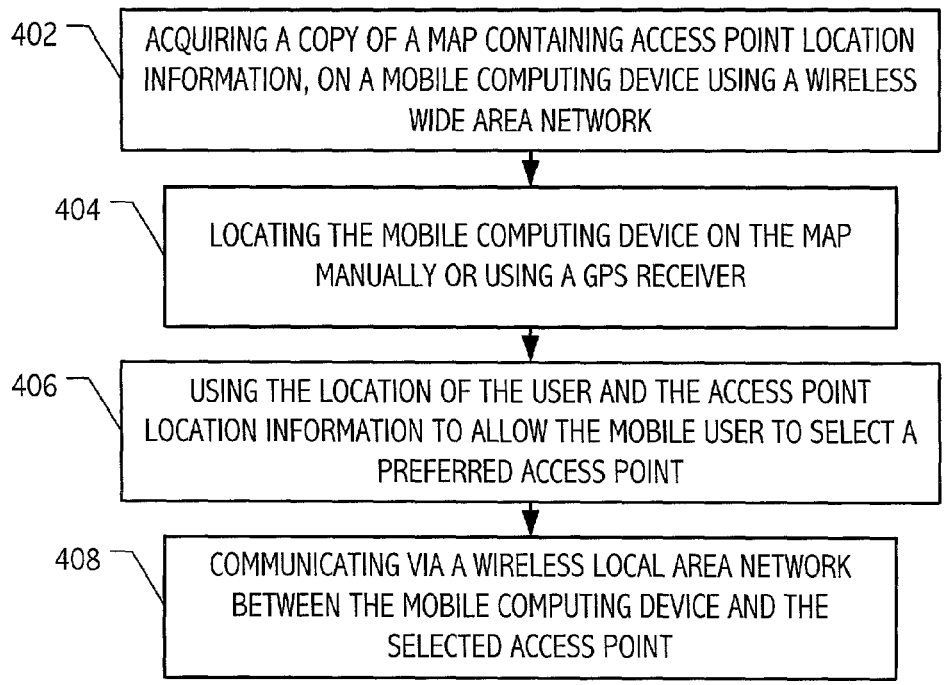
FIG. 4 is a flow chart that illustrates operation of the system of FIG. 1.

Referring to FIG. 4, operation of the portable computing device 102 within the system 100 is illustrated. A copy of a map that contains access point location information is acquired on a mobile computing device using the wireless wide area network, at 402. The mobile computing device is located on the map either manually or through the use of a GPS receiver, at 404. The location of the user and the access point location information may then be displayed on a map and used to allow the mobile user to select a preferred access point, at 406. Thereafter, communication between the mobile computing device and the selected access point may be established, at 408. At this point of operation, the portable computing device 102 is connected via the desired and selected wireless network access point and may further communicate through a wired data network and the Internet.

Figure 5:
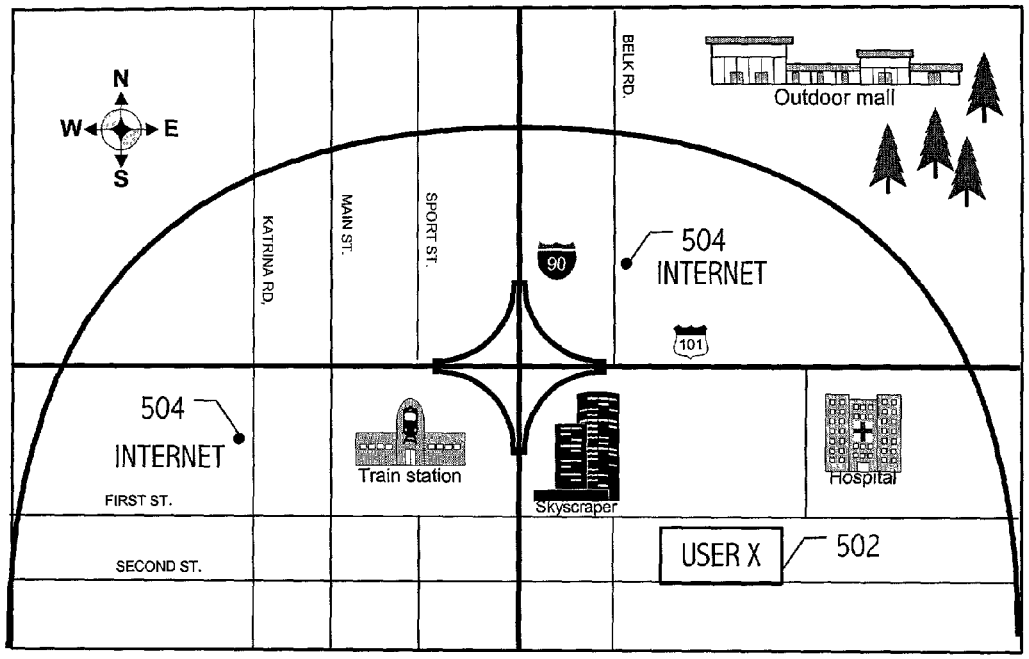
FIGS. 5 and 6 are general diagrams that illustrate a sample map display on a portable computing device.

Referring to FIG. 5, an example of a street map that may be displayed on the display device 116 is shown. The street map includes various streets, an icon representing a user location 502, and various access points 504.

Figure 6:
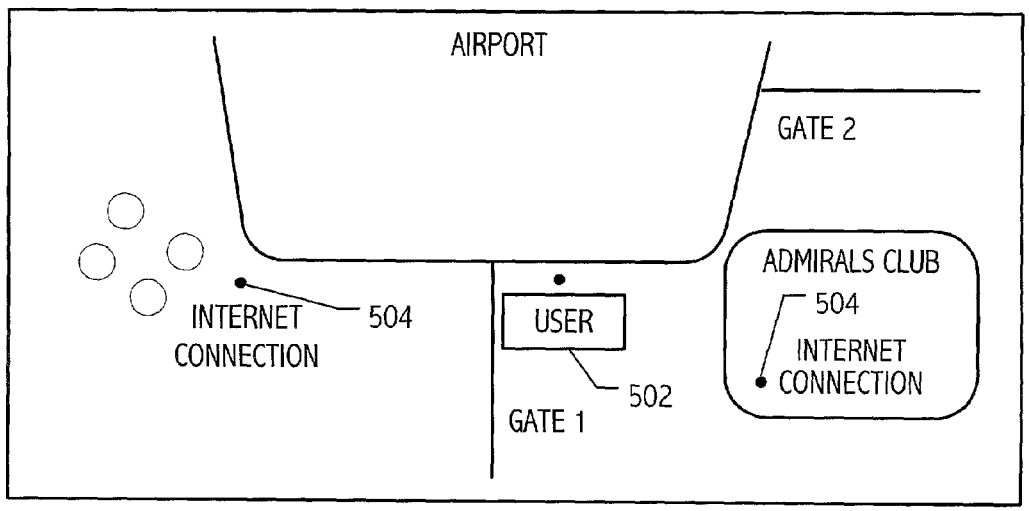

Another embodiment of a map that may be displayed is shown in FIG. 6. In this example, the map illustrates locations of various access points in an airport. The map also displays a representation of the user location. With such a map display, a mobile computing device user may conveniently locate a desired access point and may approach such access point to be in range for communication with the access point and the associated wireless data network.

The above disclosed subject matter is to be considered illustrative and the appended claims are intended to cover all such modifications and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A network comprising:
an Internet connection element;
a plurality of wireless device access points, each of the plurality of wireless device access points including a wireless transceiver, each of the plurality of wireless device access points coupled to the Internet connection element;
a memory coupled to at least one of the plurality of wireless device access points, the memory storing location data corresponding to location information of the at least one wireless device access point;
wherein the location data is applied to a man database, such that the location information of the at least one wireless device access point is added onto a map corresponding to the map database,
wherein location information of the at least one wireless device access point is retrieved automatically from a global positioning system device or otherwise entered by a user, wherein the location information of the at least one wireless device access point is represented on a map that is accessible via the Internet.

2. The network of claim 1, further comprising a computer server, the computer server coupled to the Internet connection element via a distributed computer network.

3. The network of claim 2, wherein the computer server stores a map containing access point location information and wherein the map containing the access point location information is made available to a plurality of users via the distributed computer network.

4. The network of claim 3, wherein the distributed computer network comprises the Internet.

5. The network of claim 4, further comprising a wireless wide area network element, the wireless wide area network element having access to the map stored within the computer server.

6. The network of claim 5, wherein the wireless wide area network element includes a wireless transceiver to communicate data associated with the map to a remote wireless computing device.

7. The network of claim 1, wherein the wireless device access point represented on the map is selected from the plurality of wireless device access points based on the location of the represented wireless device access point and the location of a remote wireless computing device.

8. A mobile computing device comprising:
a computer processor;
a computer memory coupled to the computer processor;
a first radio element, the first radio element to provide for communication with a wireless network access point;
a second radio element, the second radio element to provide for communication with a wireless wide area network element;
wherein data retrieved via the second radio element is stored in the computer memory and the retrieved data includes map data that identifies location information with respect to the wireless network access point; and
wherein the wireless network access point is selected from a plurality of wireless network access points based on wireless network access point location information and the location of the mobile computing device.

9. The mobile computing device of claim 8, further comprising a global positioning system element responsive to the computer processor, the global positioning system element to provide user location data with respect to the mobile computing device.

10. The mobile computing device of claim 9, wherein the map includes a representation of the user location based on the location data retrieved from the global positioning system.

11. The mobile computing device of claim 8, wherein the map data includes data that identifies a location of a plurality of wireless network access points.

12. The mobile computing device of claim 8, further comprising a display device to display a map based on the map data.

* * * * *

UNITED STATES PATENT AND TRADEMARK OFFICE
CERTIFICATE OF CORRECTION

| | | |
|---|---|---|
| PATENT NO. | : 7,054,627 B1 | Page 1 of 1 |
| APPLICATION NO. | : 10/134833 | |
| DATED | : May 30, 2006 | |
| INVENTOR(S) | : Garth D. Hillman | |

It is certified that error appears in the above-identified patent and that said Letters Patent is hereby corrected as shown below:

Col. 4, line 36, please replace "a man database" with --a map database--.

Signed and Sealed this

First Day of August, 2006

JON W. DUDAS
*Director of the United States Patent and Trademark Office*